US011965252B2

(12) United States Patent
Hirayama et al.

(10) Patent No.: US 11,965,252 B2
(45) Date of Patent: Apr. 23, 2024

(54) SPRAYED COATING AND SPRAYED-COATING MANUFACTURING METHOD (71) Applicant: NISSAN MOTOR CO., LTD., Yokohama (JP)

(72) Inventors: Hayato Hirayama, Kanagawa (JP); Tsuyoshi Higuchi, Kanagawa (JP); Yoshito Utsumi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/041,956

(22) PCT Filed: Sep. 2, 2020

(86) PCT No.: PCT/JP2020/033233
§ 371 (c)(1),
(2) Date: Feb. 16, 2023

(87) PCT Pub. No.: WO2022/049667
PCT Pub. Date: Mar. 10, 2022

(65) Prior Publication Data
US 2023/0265551 A1 Aug. 24, 2023

(51) Int. Cl.
*C23C 4/14* (2016.01)
*C23C 4/08* (2016.01)
*F02F 1/00* (2006.01)
*F16J 10/04* (2006.01)

(52) U.S. Cl.
CPC ............... *C23C 4/14* (2013.01); *C23C 4/08* (2013.01); *F02F 1/00* (2013.01); *F16J 10/04* (2013.01)

(58) Field of Classification Search
None
See application file for complete search history.

(56) References Cited

U.S. PATENT DOCUMENTS

| 6,220,214 B1 | 4/2001 | Kojima et al. |
| 2003/0164150 A1 | 9/2003 | Barbezat |
| 2003/0192501 A1 | 10/2003 | Ishikawa et al. |

FOREIGN PATENT DOCUMENTS

| DE | 10312227.1 A1 | 10/2003 |
| JP | S63-195255 A | 8/1988 |
| JP | 2000-283291 A | 10/2000 |
| JP | 2002-364455 A | 12/2002 |
| JP | 2003-286895 A | 10/2003 |
| JP | 2003-340565 A | 12/2003 |
| JP | 2004-100645 A | 4/2004 |
| JP | 2004-232034 A | 8/2004 |
| JP | 2004-232035 A | 8/2004 |
| JP | 2006-123068 A | 5/2006 |
| JP | 2007-302941 A | 11/2007 |
| JP | 2008-019718 A | 1/2008 |

(Continued)

*Primary Examiner* — Daniel J. Schleis
(74) *Attorney, Agent, or Firm* — Foley & Lardner LLP (57) ABSTRACT The present invention provides a thermally sprayed coating that is a thermally sprayed iron-based coating formed on an inner circumferential surface of a cylinder bore of an aluminum or aluminum alloy cylinder block. The thermally sprayed coating has a plastic deformation part on its surface. Thus, pores on the surface of the thermally sprayed coating are reduced, resulting in a reduction in the amount of oil consumption.

6 Claims, 5 Drawing Sheets (56) References Cited

FOREIGN PATENT DOCUMENTS

| | | | |
|---|---|---|---|
| JP | 2009-115037 A | | 5/2009 |
| JP | 2009115037 | * | 5/2009 |
| JP | 2016-169725 A | | 9/2016 |

* cited by examiner

SPRAYED COATING AND SPRAYED-COATING MANUFACTURING METHOD

TECHNICAL FIELD

The present invention relates to a thermally sprayed coating and a method for manufacturing the thermally sprayed coating, and in more detail, relates to a thermally sprayed coating that is formed on an inner circumferential surface of a cylinder bore of an internal combustion engine and a method for manufacturing the thermally sprayed coating.

BACKGROUND ART

Cylinder bores of internal combustion engines, such as of automobiles, are required to have wear resistance and low friction properties and are thereby have thermally sprayed iron-based coatings that are higher in hardness than metal materials constituting cylinder block bodies.

The thermally sprayed coating is formed by thermally spraying droplets of an iron-based metal material on a preprocessed inner circumferential surface of a bore of a cylinder block that is preheated.

The thermally sprayed coating includes pores that are formed between the thermally sprayed droplets, and it has fine pores on its surface even after being mirror polished. Oil enters these pores and prevents seizing. Thus, mirror polishing can reduce friction, but oil that enters the pores is burnt and is consumed.

Patent document 1 discloses a method for achieving reduction in friction and in amount of oil consumption by mirror polishing while preventing a cylinder bore from being damaged by fine particles. The fine particles are not combined with a thermally sprayed coating and can fall off therefrom, but in this method, they are removed in advance.

CITATION LIST

Patent Document

Patent Document 1: JP 2016-169725A

SUMMARY OF INVENTION

Technical Problem

Unfortunately, a thermally sprayed coating essentially includes pores, and therefore, internal pores newly appear on a surface even when the surface is mirror polished. For this reason, it is difficult for some types of polishing to further reduce an area ratio of pores (the number and dimensions of pores) that are exposed on a surface of a thermally sprayed coating.

The present invention has been made in view of such problems in existing techniques, and an object of the present invention is to provide a thermally sprayed coating with a mirror-polished surface having pores exposed at a small area ratio, thereby consuming less oil, and to also provide a method for manufacturing the thermally sprayed coating.

Solution to Problem

The inventors of the present invention have conducted an intensive study in order to achieve the above-described object, and they have found that making plastic flow occur on a mirror-polished surface of a thermally sprayed coating to fill pores that are exposed on the surface of the thermally sprayed coating, enables achieving the above-described object. Thus, the present invention has been completed.

That is, the present invention provides a thermally sprayed coating that is a thermally sprayed iron-based coating formed on an inner circumferential surface of a cylinder bore of an aluminum or aluminum alloy cylinder block.

The thermally sprayed coating has a surface including a plastic deformation part. An area ratio of the plastic deformation part is 4.6% or greater. A surface roughness (Ra) of the thermally sprayed coating is 0.1 μm or less.

The present invention also provides a method for manufacturing a thermally sprayed coating that is a method for forming a thermally sprayed iron-based coating on an inner circumferential surface of an aluminum or aluminum alloy cylinder block.

The method includes a thermal spraying step for forming a thermally sprayed coating, a mirror polishing step for mirror polishing a surface of the thermally sprayed coating, and a finishing step for causing plastic flow on the surface of the thermally sprayed coating to form a plastic deformation part. The finishing step is performed such that an area ratio of the plastic deformation part is 4.6% or greater, and a surface roughness (Ra) of the thermally sprayed coating is caused to be 0.1 μm or less by using a whetstone that is a honing stone on which diamond abrasive grains are bonded with Cu—Sn alloy having a hardness of 380 to 480 HV.

Advantageous Effects of Invention

In the present invention, plastic flow is made to occur on the mirror-polished surface of the thermally sprayed coating. Thus, it is possible to provide a thermally sprayed coating with a surface having a decreased amount of pores, thereby consuming less oil, and to also provide a method for manufacturing the thermally sprayed coating.

DESCRIPTION OF EMBODIMENTS

<Thermally Sprayed Coating>

A thermally sprayed coating of the present invention will be described in detail.

The thermally sprayed coating is a thermally sprayed iron-based coating that is formed on an inner circumferential surface of a cylinder bore of an aluminum or aluminum alloy cylinder block, and the thermally sprayed coating has a plastic deformation part on its surface.

The plastic deformation part is an area in which a matrix of a metal material of the thermally sprayed coating flows and is plastically deformed due to the surface of the thermally sprayed coating being strongly rubbed.

Figure 1:
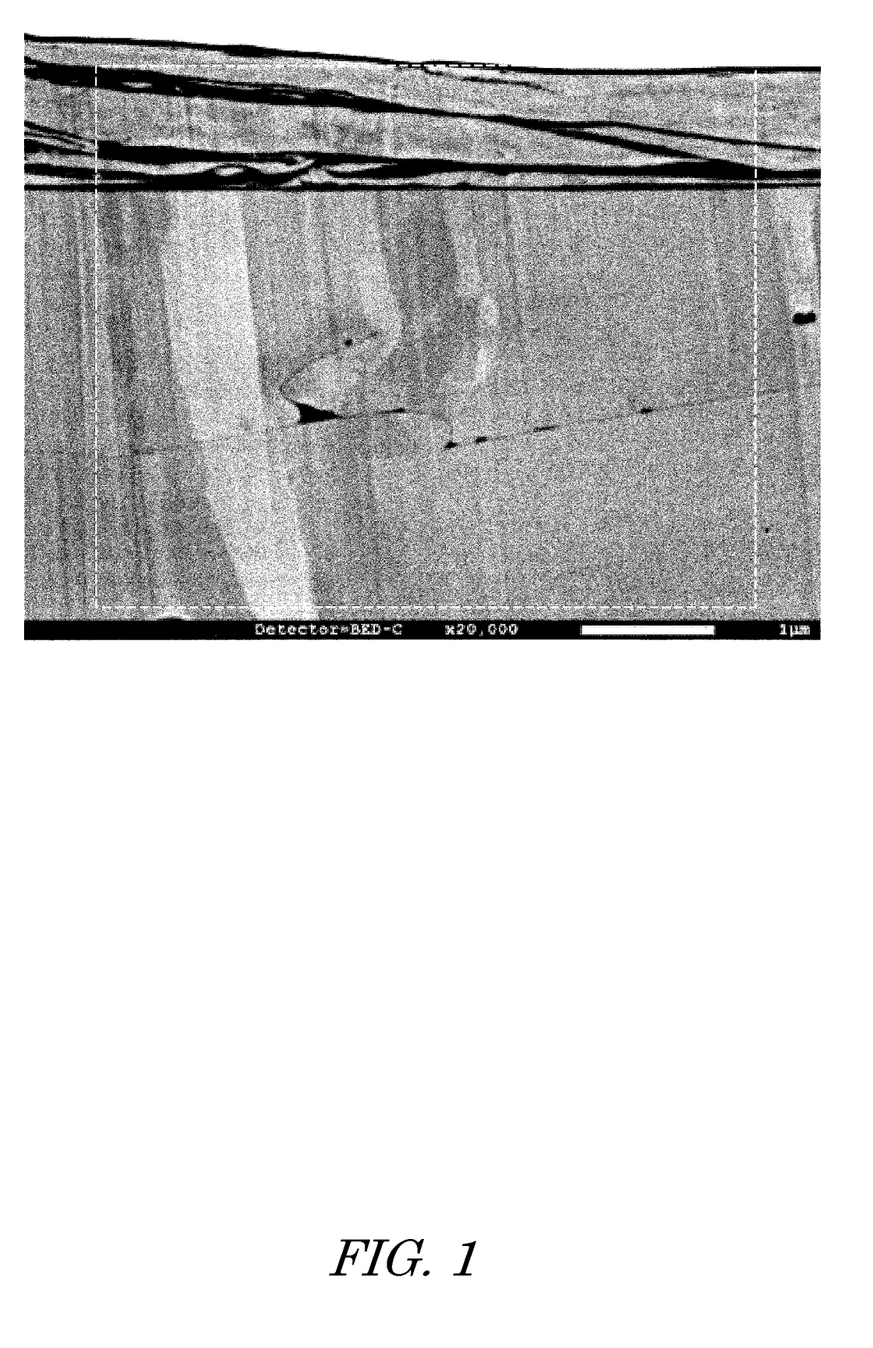
FIG. 1 is a SEM image of a cross section of a thermally sprayed coating of the present invention.
Figure 2:
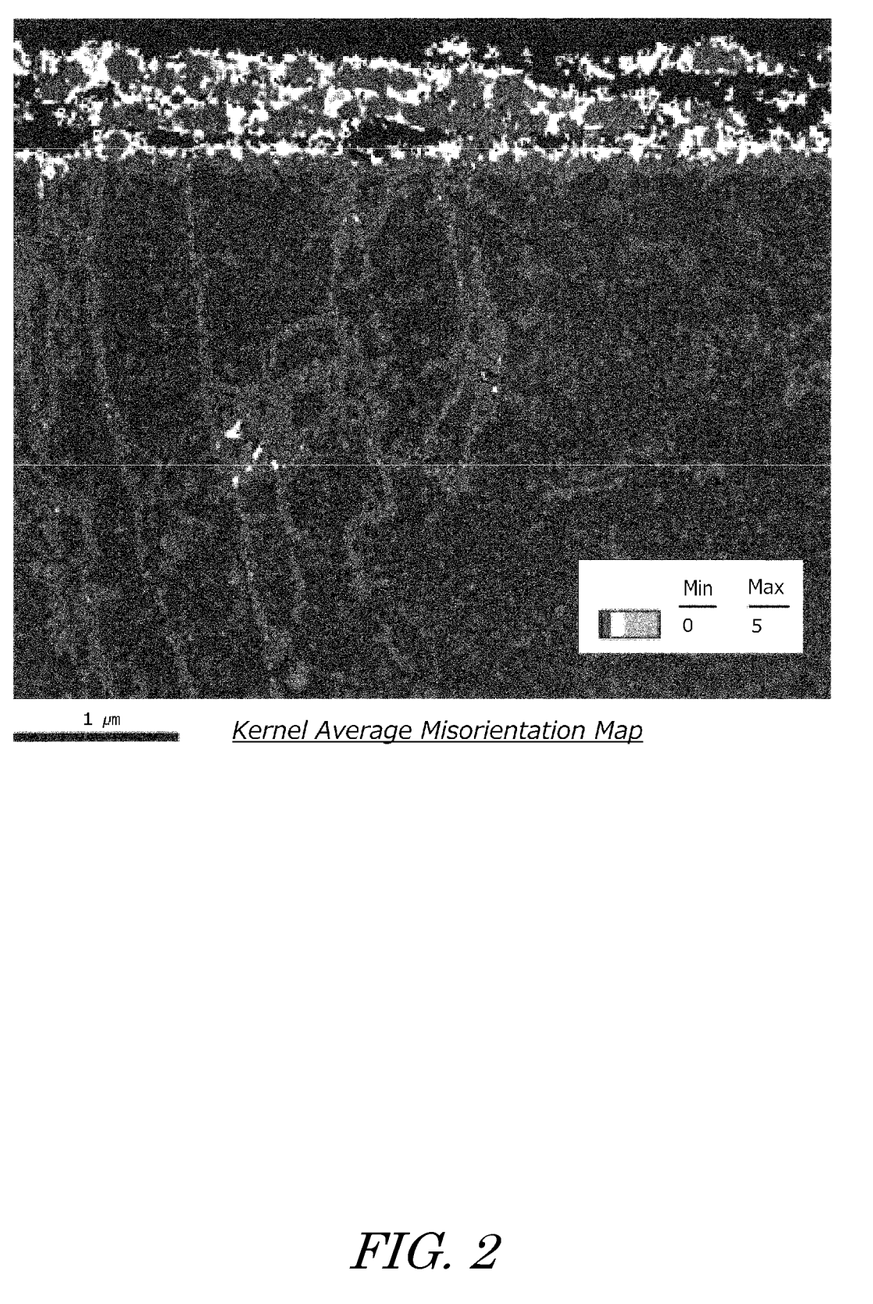
FIG. 2 is an EBSD image of the cross section of the thermally sprayed coating of the present invention.

A SEM image of a cross section of a thermally sprayed coating of the present invention is illustrated in FIG. 1, and an electron back scatter diffraction patterns (EBSD) image of a part surrounded by a broken line in FIG. 1 is illustrated in FIG. 2.

FIG. 1 shows that the thermally sprayed coating of the present invention includes a metal structure on its surface, which is different from the metal structure inside thereof. In addition, FIG. 2 illustrates the surface in light color and shows that strain was accumulated due to strong rubbing.

In the present invention, the metal material is plastically deformed to form a plastic deformation part, and the metal material around pores flows to fill the pores, whereby an area ratio of the pores exposed on the surface is decreased. Thus, it is possible to reduce an amount of oil consumption.

The area ratio of the plastic deformation part is preferably 4.6% or greater and is more preferably 6.0% or greater. The plastic deformation part in an area ratio of 4.6% or greater enables reducing an amount of oil consumption to be in a desired range.

The upper limit of the area ratio of the plastic deformation part is not specifically limited. However, if the area ratio of the plastic deformation part is excessively increased, surface pores that function as oil retainers are decreased, and seizing may occur. Moreover, from the point of view of improvement in productivity and cost saving, the area ratio of the plastic deformation part is preferably 11.4% or less.

The thermally sprayed coating preferably has a hardness of 3.9 to 9.1 GPa and more preferably has a hardness of 5.0 to 8.0 GPa.

If the hardness is less than 3.9 GPa, a desired wear resistance may not be obtained. On the other hand, if the hardness exceeds 9.1 GPa, it may be difficult to obtain low friction properties.

The thermally sprayed coating is preferably mirror polished so that the surface roughness (Ra) will be 0.1 μm or less. In the state in which the surface roughness is 0.1 μm or less, low friction properties can be obtained.

<Method for Manufacturing Thermally Sprayed Coating>

A method for manufacturing the thermally sprayed coating includes a thermal spraying step for forming a thermally sprayed coating, a mirror polishing step for mirror polishing a surface of the thermally sprayed coating, and a finishing step for causing plastic flow on the surface of the thermally sprayed coating to form a plastic deformation part.

(Finishing Step)

The finishing step is a step for forming a plastic deformation part on the thermally sprayed coating that is mirror polished. The plastic deformation part is formed by strongly rubbing the surface of the thermally sprayed coating, instead of grinding and polishing.

Specifically, the plastic deformation part is formed by pressing a honing stone against the thermally sprayed coating and performing honing. The honing stone has abrasive grains that hardly come off, in other words, the honing stone has abrasive grains that are hardly replaced with inside abrasive grains and that are appropriately rounded.

A whetstone on which diamond abrasive grains are bonded with Cu—Sn alloy having a hardness of 380 to 480 HV, is used as the honing stone.

If a bonding material for bonding diamond abrasive grains has a hardness of less than 380 HV, diamond abrasive grains on the surface of the honing stone come off, and instead, inside diamond abrasive grains appear on the surface. Thus, the surface of the thermally sprayed coating is ground and polished, which makes it difficult to form the plastic deformation part.

On the other hand, if the hardness of the bonding material exceeds 480 HV, abrasive grains tend to not be replaced with inside abrasive grains although the bonding material wears away, and abrasive grains that protrude scrape the surface of the thermally sprayed coating and easily cause scratches.

The area ratio of the plastic deformation part can be adjusted by the number of times of strokes of the honing stone and an application load applied to the honing stone in the finishing step, and hardness of the honing stone.

The hardness of the thermally sprayed coating can be adjusted by a composition of thermal spray wire to be used (thermally sprayed coating), as well as an application load applied to the honing stone in the finishing step and hardness of the honing stone.

The composition of the thermal spray wire can be a composition of thermal spray wire that has been used heretofore in thermal spraying of a cylinder bore. However, the amount of carbon (C) is preferably 0.05 mass % or less and is more preferably 0.01 mass % or less.

A great amount of carbon makes the thermally sprayed coating very hard before the plastic deformation part is formed, whereby it is difficult to form the plastic deformation part.

The thermally sprayed coating is work hardened by forming the plastic deformation part in the finishing step. The thermally sprayed coating before the finishing step has a hardness of 2.0 to 3.3 GPa, and in this condition, the plastic deformation part is easily formed.

EXAMPLES

The present invention will be detailed with reference to examples hereinafter, but the present invention should not be limited to the examples described below.

<Thermal Spraying Step>

A gasoline engine cylinder block made of an aluminum alloy (ADC12Z) was prepared. The cylinder block had a cylinder bore inner circumferential surface that was preprocessed so as to have grooves with a depth of approximately 85 μm. A thermally sprayed coating was formed so as to have a film thickness of 270 μm from the bottom of the groove, by using an arc spraying method under the following thermal spraying conditions, whereby a cylinder bore having an inner diameter of approximately 80 mm and a total length of approximately 120 mm was produced.

An iron-based thermal spray wire (outer diameter: 1.58 mm) having the following composition and being subjected to copper (Cu) electroplating, was used.

Amount of carbon (C): 0.009%
Amount of manganese (Mn): 0.35%
Amount of nickel (Ni): 0.22%
Amount of chromium (Cr): 12.34%
Amount of molybdenum (Mo): 0.09%
Amount of silicon (Si): 0.42%
Amount of iron (Fe): Balance (Thermal Spraying Conditions)

After the cylinder block was preheated to 120° C., a nozzle was inserted in the cylinder bore at a room temperature, and droplets were thermally sprayed at 1200 L/min while nitrogen gas was used for dispersing the thermal spray droplets.

<Mirror Polishing Step>

Honing was performed by making a honing stone, which was pressed against the cylinder bore, reciprocate in an upper-lower direction of the cylinder bore while rotating, whereby an inner surface of the cylinder bore was mirror polished (so as to have a surface roughness Ra of 0.1 μm or less).

Examples 1 to 8

<Finishing Step>

A honing stone (honing stone on which diamond abrasive grains were bonded with Cu—Sn alloy having a hardness of 430 HV; volume ratio of the abrasive grains to the bonding material=20:80) was pressed against the mirror-polished cylinder bore and was reciprocated in the upper-lower direction of the cylinder bore while being rotated (clockwise direction, 2,000 rpm) under the conditions shown in Table 1. In this state, honing was performed by varying the number of times of strokes, to cause plastic flow on the inner surface of the cylinder bore, whereby a thermally sprayed coating having a mirror-polished surface with a surface roughness Ra of 0.1 μm or less was formed.

(Measurement of Area Ratio of Plastic Deformation Part)

The thermally sprayed coating was cut out in the form of a cylinder block with the thermally sprayed coating (10 mm in height×10 mm in width×5 mm in thickness), whereby a test piece of a cylinder block with the thermally sprayed coating was obtained.

A SEM image of the test piece was obtained at a magnification of 500 times by backscattered electron composition image measurement using a SEM (scanning electron microscope: Hitachi S-3400N).

Figure 3:
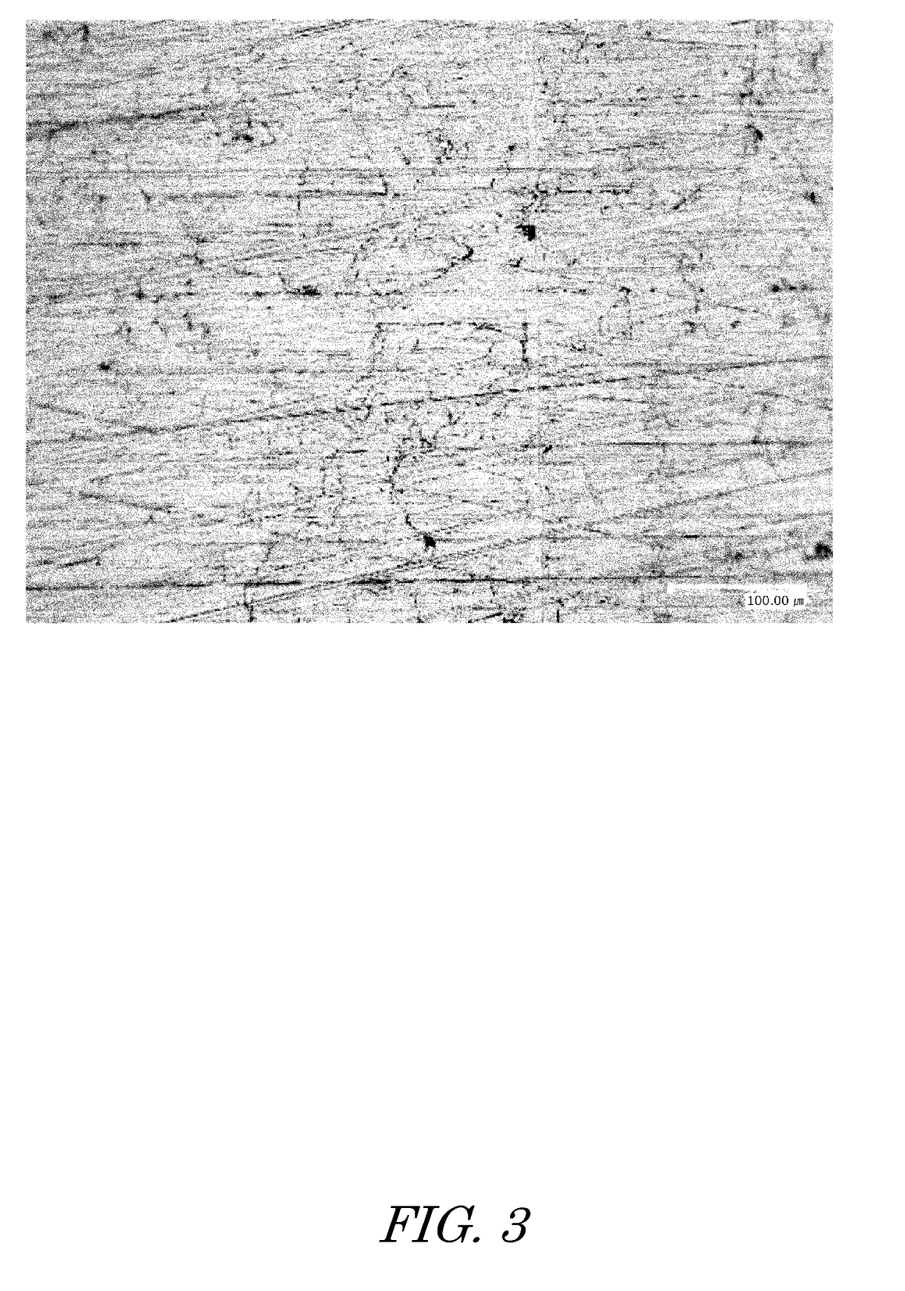
FIG. 3 is a SEM image of a surface of a thermally sprayed coating of Example 1.
Figure 4:
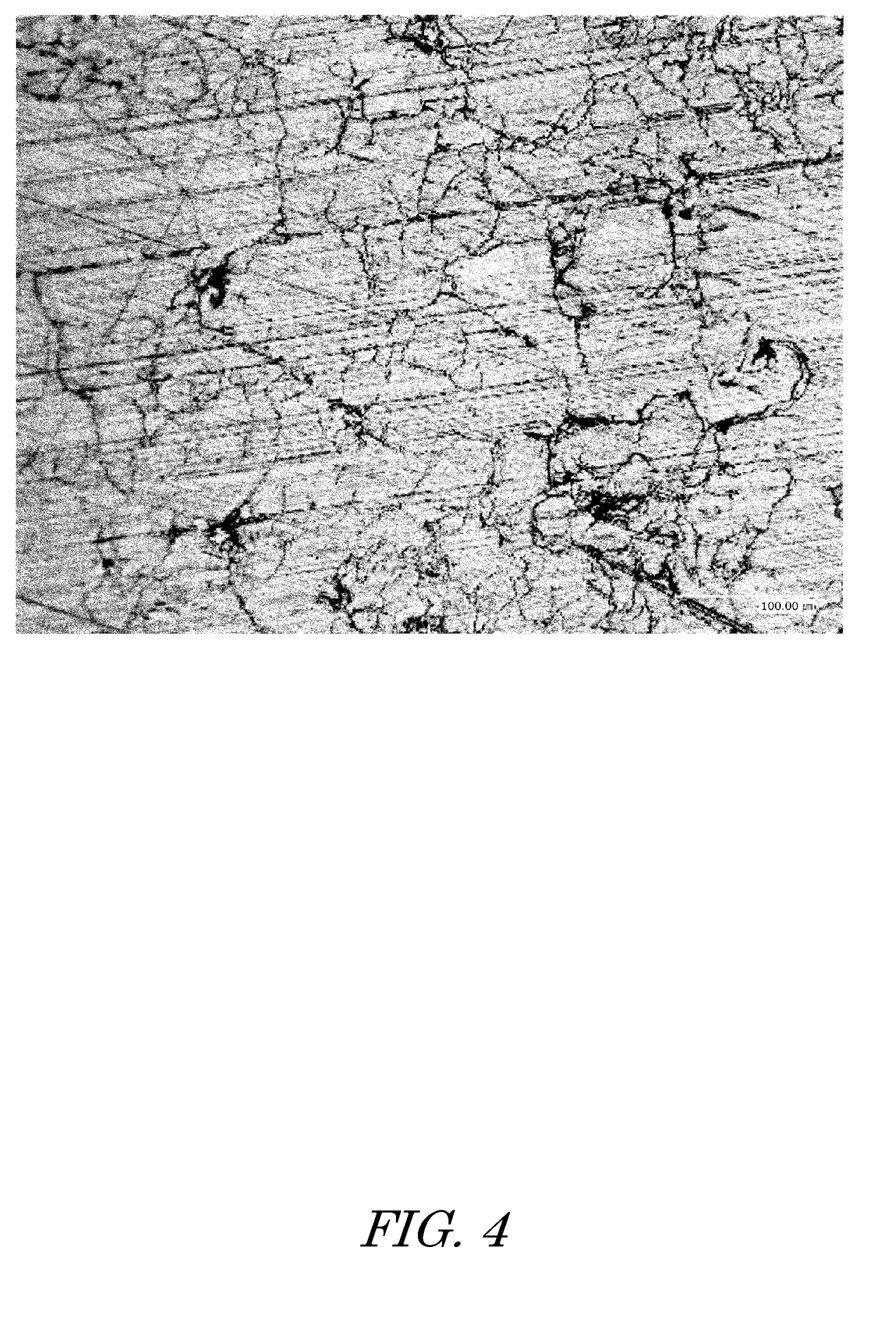
FIG. 4 is a SEM image of a surface of a thermally sprayed coating of Example 3.
Figure 5:
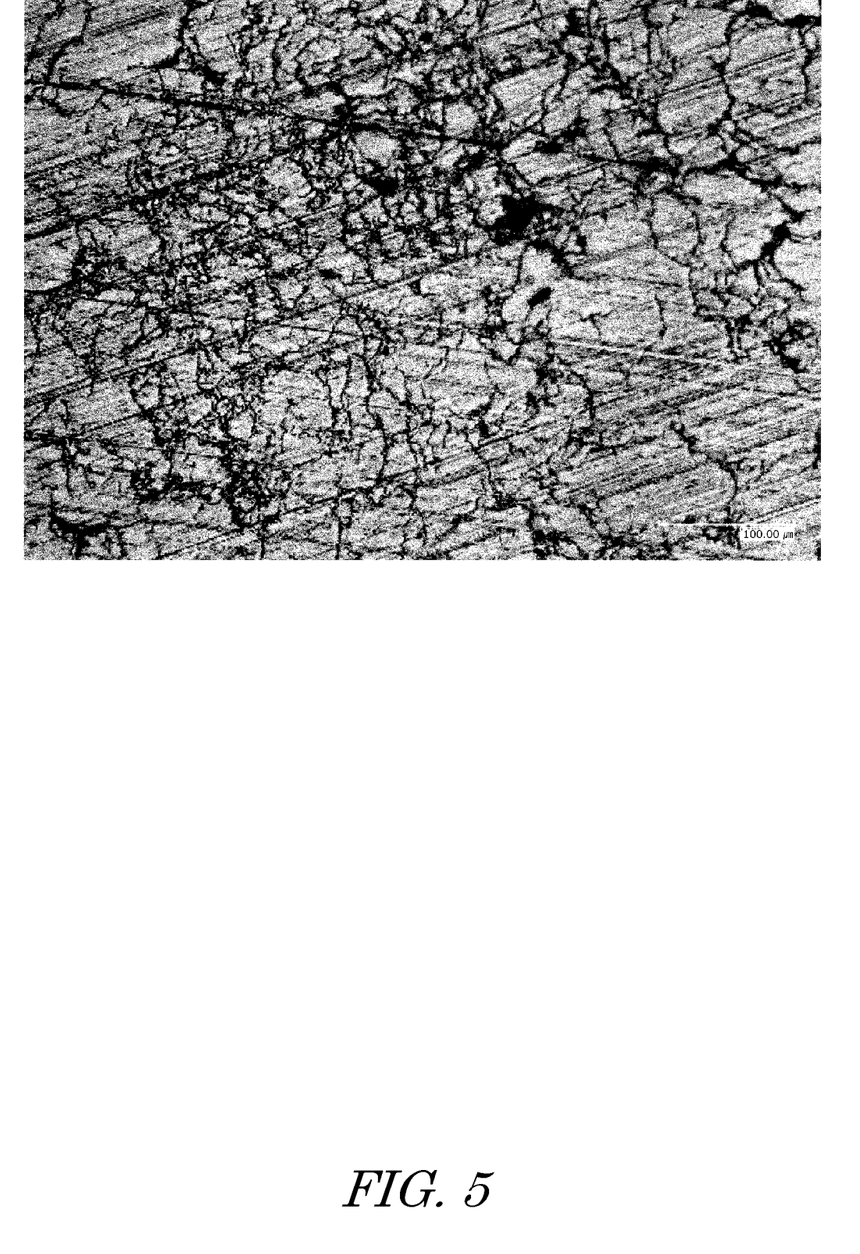
FIG. 5 is a SEM image of a surface of a thermally sprayed coating of Example 5.

A SEM image of a surface of a thermally sprayed coating of Example 1 is illustrated in FIG. 3. A SEM image of a surface of a thermally sprayed coating of Example 3 is illustrated in FIG. 4. A SEM image of a surface of a thermally sprayed coating of Example 5 is illustrated in FIG. 5.

The obtained SEM image was binarized by image processing in order to separate pores (dark parts) and the other part (light part) from each other. The light part was further binarized by image processing in order to separate a plastic deformation part (dark part) and the other part (light part) from each other, and the plastic deformation part was measured. Then, the area of the plastic deformation part was divided by a visual field area, and an average of ten points was used as an area ratio of the plastic deformation part.

Area of one piece of plastic deformation part: A1, A2, A3
Area of plastic deformation part: ΣA(A1+A2+A3 . . . )
Area ratio of plastic deformation part: ΣA/S (Measurement of Surface Roughness)

A surface roughness (Ra) was measured by a method specified in JIS B 0601.

(Measurement of Hardness of Thermally Sprayed Coating)

In conformity with a microhardness measurement method in ISO14577, the cylinder block with the thermally sprayed coating was cut out into a size of 5 mm in height×5 mm in width×2 mm in thickness, and the cross section of the cut-out piece was polished by a cross section polisher. Under vacuum, after parts other than a target area on a surface of a test piece was masked with a shield plate, the test piece was irradiated with Ar ions (acceleration voltage of Ar ion: 3 to 6 kV, processing speed: approximately 100 μm/h), whereby a cross section was mirror polished. Thus, a cross section without chipping the test piece and without a shear drop at ends was produced.

Thereafter, the cross section was subjected to an etching treatment, and a structure of the thermally sprayed coating was observed. Then, a diamond indenter was pressed to a position of 1 um depth from the uppermost surface, and hardness of the thermally sprayed coating was measured under the following condition.

Measurement apparatus: Nano Indenter G200

A hardness H (Pmax/A) was measured from a maximum indentation load (Pmax) and an indentation projected area (A).

(Measurement of Amount of Oil Consumption)

The cylinder block that was formed with the thermally sprayed coating was used to assemble a four-cylinder engine, and an amount of oil consumption was measured by a continuous weighing method using 0W-20 that is specified by SAE J300, at 6,000 rpm and full load (wide open throttle (WOT)).

The results of measurement are shown in Table 1.

TABLE 1

|  | Number of Times of Strokes | Application Load Applied to Honing Stone (N) | Hardness of Honing Stone (HV) |
| --- | --- | --- | --- |
| Example 1 | 14 | 2000N | 430 |
| Example 2 | 16 | 2000N | 430 |
| Example 3 | 18 | 2000N | 430 |
| Example 4 | 20 | 2000N | 430 |
| Example 5 | 25 | 2000N | 430 |
| Example 6 | 10 | 2000N | 430 |
| Example 7 | 12 | 2000N | 430 |
| Example 8 | 40 | 2000N | 430 |

|  | Area Ratio of Plastic Deformation Part | Hardness of Thermally Sprayed Coating (Gpa) | Amount of Oil Consumption (g/h) |
| --- | --- | --- | --- |
| Example 1 | 3.20% | 5.4 | 59 |
| Example 2 | 4.10% | 5.4 | 52 |
| Example 3 | 6.00% | 5.5 | 45 |
| Example 4 | 8.90% | 5.5 | 33 |
| Example 5 | 11.40% | 5.5 | 25 |
| Example 6 | 1.10% | 5.2 | 90 |
| Example 7 | 1.80% | 5.3 | 71 |
| Example 8 | 14.00% | 5.3 | 18 |

The results in Table 1 show that the area ratio of the plastic deformation part increases with an increase in the number of times of strokes in honing of the finishing step and that the amount of oil consumption decreases with an increase in the area ratio of the plastic deformation part. In addition, the results in Table 1 show that in the condition in which the area ratio of the plastic deformation part is 4.6% or greater, the amount of oil consumption is reduced to be 50 g/h or less.

Examples 9 to 14

<Finishing Step>

A honing stone (honing stone on which diamond abrasive grains were bonded with Cu—Sn alloy having a hardness of 430 HV; volume ratio of the abrasive grains to the bonding material=20:80) was pressed against the mirror-polished cylinder bore and was reciprocated in the upper-lower direction of the cylinder bore while being rotated (clockwise direction, 2,000 rpm) under the conditions shown in Table 2. In this state, honing was performed by varying an application load for pressing the honing stone, to cause plastic flow on the inner surface of the cylinder bore. As a result, thermally sprayed coatings having different area ratios of the plastic deformation part and having different hardness were formed.

Thereafter, the area ratio of the plastic deformation part of the thermally sprayed coating was observed, and buffing was performed by using 3-um diamond abrasive grains. Moreover, while the area ratio of the plastic deformation part was checked in a SEM image, buffing was further performed by using 1-um diamond abrasive grains so that the area ratio of the plastic deformation part would be approximately 6%, whereby a thermally sprayed coating having a mirror-polished surface with a surface roughness Ra of 0.1 μm or less was formed.

(Measurement of Coefficient of Friction and Wear Amount)

A coefficient of friction and a wear amount of the thermally sprayed coating were measured under the following conditions.

The results of measurement are shown in Table 2.

The cylinder block that was formed with the thermally sprayed coating was cut out into a test piece (15 mm in height×20 mm in width×5 mm in thickness).

On the other hand, a piston ring test piece (3 mm in height×15 mm in width) was cut out from a piston ring that had a hard carbon film with a surface roughness Ra of 0.1 μm or less on a surface.

These test pieces were slid under the following conditions, and a coefficient of friction and a wear depth after the test were measured.

(Test Conditions)

Apparatus: SRV wear tester *(Schwingungs Reihungund Verschleiss)

Temperature: Room temperature (25° C.)

Load: 300 N

Amplitude: 3 mm

Frequency: 25 Hz

Test time: 60 minutes

Lubricating oil used: Poly-α-olefin (PAO) in which the kinematic viscosity is 4 cSt at 100° C.

TABLE 2

| | Number of Times of Strokes | Application Load Applied to Honing Stone (N) | Hardness of Honing Stone (HV) |
|---|---|---|---|
| Example 9 | 40 | 1900 | 430 |
| Example 10 | 40 | 2000 | 430 |
| Example 11 | 40 | 2300 | 430 |
| Example 12 | 40 | 2500 | 430 |
| Example 13 | 40 | 1600 | 430 |
| Example 14 | 40 | 2800 | 430 |

| | Area Ratio of Plastic Deformation Part | Hardness of Thermally Sprayed Coating (Gpa) | Coefficient of Friction (μ) | Wear Amount (μm) |
|---|---|---|---|---|
| Example 9 | 6.10% | 3.9 | 0.11 | 0.5 or less |
| Example 10 | 6.00% | 5.4 | 0.13 | 0.5 or less |
| Example 11 | 6.10% | 5.9 | 0.14 | 0.5 or less |
| Example 12 | 6.10% | 9.1 | 0.14 | 0.5 or less |
| Example 13 | 6.10% | 3.5 | 0.17 | 1.2 |
| Example 14 | 6.20% | 10.2 | 0.18 | 0.5 or less |

The results in Table 2 show that the thermally sprayed coating is hardened in accordance with an increase in the application load applied to the honing stone and that the thermally sprayed coating having a hardness of 3.9 to 9.1 GPa has both wear resistance and low friction properties.

Examples 15 to 18 and Comparative Example 1

<Finishing Step>

Each of honing stones that use bonding materials having different hardness was used against the mirror-polished cylinder bore and was reciprocated in the upper-lower direction of the cylinder bore while being rotated (clockwise direction, 2,000 rpm) under the conditions shown in Table 3. In this state, honing was performed to cause plastic flow on the inner surface of the cylinder bore. As a result, thermally sprayed coatings having different area ratios of the plastic deformation part were formed.

Presence/Absence of scratches was observed in a SEM image of a surface of the thermally sprayed coating.

TABLE 3

| | Number of Times of Strokes | Application Load Applied to Honing Stone (N) | Bonding Material of Honing Stone | Hardness of Honing Stone (HV) | Area Ratio of Plastic Deformation Part (%) |
|---|---|---|---|---|---|
| Example 15 | 40 | 2000 | Cu-Sn Alloy | 380 | 13.9 |
| Example 16 | 40 | 2000 | Cu-Sn Alloy | 430 | 14 |
| Example 17 | 40 | 2000 | Cu-Sn Alloy | 480 | 14.4 |
| Example 18 | 40 | 2000 | Polyimide Resin | 90 | 1.3 |
| Comparative Example 1 | 40 | 2000 | Cu-Sn Alloy | 650 | Scratches |

Example 18 was not practicable because the frequency of changing the honing stone was high, which reduced productivity.

Table 3 shows that the area ratio of the plastic deformation part increases with an increase in hardness of the honing stone (bonding material) and that the plastic deformation part is efficiently formed when the hardness is in the range of 380 to 480 HV.

The invention claimed is:

1. An apparatus comprising:
   an aluminum or aluminum alloy cylinder block having a cylinder bore; and
   a thermally sprayed iron-based coating that is formed on an inner circumferential surface of the cylinder bore, the thermally sprayed iron-based coating having a plastic deformation part on its surface, wherein an area ratio of an area of a surface of the plastic deformation part to an area of a surface of the thermally sprayed iron-based coating is 4.6% or greater, and a surface roughness (Ra) of the thermally sprayed iron-based coating is 0.1 μm or less.

2. The apparatus according to claim 1, wherein the thermally sprayed iron-based coating has a hardness of 3.9 GPa to 9.1 GPa.

3. The apparatus according to claim 1, wherein the area ratio does not exceed 11.4%.

4. A method for forming a thermally sprayed iron-based coating on an inner circumferential surface of an aluminum or aluminum alloy cylinder block, the method comprising:
   a thermal spraying step comprising forming the thermally sprayed iron-based coating on the inner circumferential surface of the aluminum or aluminum alloy cylinder block;

a mirror polishing step comprising mirror polishing a surface of the thermally sprayed iron-based coating; and a finishing step comprising causing plastic flow on the surface of the thermally sprayed iron-based coating to form a plastic deformation part, wherein the finishing step is performed such that an area ratio of an area of a surface of the plastic deformation part to an area of the surface of the thermally sprayed iron-based coating is 4.6% or greater, and a surface roughness (Ra) of the thermally sprayed iron-based coating is caused to be 0.1 μm or less by using a whetstone that is a honing stone on which diamond abrasive grains are bonded with Cu—Sn alloy having a hardness of 380 to 480 HV.

5. The method according to claim 4, wherein the finishing step is performed so that the area ratio does not exceed 11.4%.

6. The method according to claim 4, wherein, after the finishing step, the thermally sprayed iron-based coating has a hardness of 3.9 GPa to 9.1 GPa.

* * * * *